United States Patent
Bodensteiner et al.

(10) Patent No.: US 10,162,422 B2
(45) Date of Patent: Dec. 25, 2018

(54) CONTROL OF MACHINES THROUGH DETECTION OF GESTURES BY OPTICAL AND MUSCLE SENSORS

(71) Applicant: Deere & Company, Moline, IL (US)

(72) Inventors: Zachary Bodensteiner, North Liberty, IA (US); Jeremiah J. Johnson, Silvis, IL (US); Kory F. Miller, Muscatine, IA (US); Andrew Z. Jarvie, Davenport, IA (US); Daniel F. Murphy, Rapids City, IL (US)

(73) Assignee: Deere & Company, Moline, IL (US)

( * ) Notice: Subject to any disclaimer, the term of this patent is extended or adjusted under 35 U.S.C. 154(b) by 199 days.

(21) Appl. No.: 15/289,727

(22) Filed: Oct. 10, 2016

(65) Prior Publication Data

US 2018/0101235 A1 Apr. 12, 2018

(51) Int. Cl.
| | |
|---|---|
| G06F 3/01 | (2006.01) |
| G06F 3/03 | (2006.01) |
| G06F 3/0346 | (2013.01) |
| G06F 3/14 | (2006.01) |
| H04W 4/02 | (2018.01) |
| H04W 76/10 | (2018.01) |
| H04W 4/021 | (2018.01) |
| E02F 9/20 | (2006.01) |

(52) U.S. Cl.
CPC ............ *G06F 3/017* (2013.01); *G06F 3/014* (2013.01); *G06F 3/015* (2013.01); *G06F 3/0304* (2013.01); *G06F 3/0346* (2013.01); *G06F 3/14* (2013.01); *H04W 4/021* (2013.01); *H04W 76/10* (2018.02); *E02F 9/2004* (2013.01); *G05D 2201/02* (2013.01); *G05D 2201/0216* (2013.01); *G06F 2203/0384* (2013.01)

(58) Field of Classification Search
CPC .......... G06F 3/017; G06F 3/14; G06F 3/0304; G06F 3/0346; G06F 3/015; G06F 2203/0384; H04W 4/021; H04W 76/02; E02F 9/2004
See application file for complete search history.

(56) References Cited

U.S. PATENT DOCUMENTS

| | | | |
|---|---|---|---|
| 5,594,469 A | 1/1997 | Freeman et al. | |
| 2008/0103639 A1* | 5/2008 | Troy | G05D 1/0027 701/2 |
| 2014/0098018 A1 | 4/2014 | Kim et al. | |

(Continued)

OTHER PUBLICATIONS

Extended European Search Report for European Patent Application No. 17190220.8 dated Jan. 5, 2018; 10 pages.

(Continued)

*Primary Examiner* — Andrew Sasinowski
(74) *Attorney, Agent, or Firm* — Brinks Gilson & Lione

(57) ABSTRACT

A material handler system including a plurality of components and material handler equipment, and methods for utilizing the same, is disclosed. A first component includes gesture command recognition and enhancement for controlling material handler equipment. A second component includes a safeguarding engine for testing the gesture command inputs and improving reliability of the gesture command recognition. A location tracking feature for tracking a location of the material handler equipment in view of a geo-fence is also referenced by the material handler system.

20 Claims, 13 Drawing Sheets

(56) References Cited

U.S. PATENT DOCUMENTS

| | | | | |
|---|---|---|---|---|
| 2015/0057770 A1* | 2/2015 | Bailey | A61B 5/6829 | 700/83 |
| 2015/0148077 A1* | 5/2015 | Jelle | H04W 4/021 | 455/456.3 |
| 2015/0234469 A1* | 8/2015 | Akiyoshi | G06F 3/017 | 345/156 |
| 2016/0173531 A1* | 6/2016 | Gupta | H04L 63/20 | 726/1 |

OTHER PUBLICATIONS https://www.youtube.com/watch?v=mF_eqfWI7wg (Published on Aug. 6, 2013; Accessed Oct. 17, 2016).

Evan Ackerman, "MYO Armband Provides Effortless Gesture Control of Robots, Anything Else" http://spectrum.ieee.org/automaton/robotics/robotics-hardware/thalmic-myo-armband-provides-effortless-gesture-control-of-robots (posted Feb. 11, 2014; accessed Oct. 17, 2016).

\* cited by examiner

CONTROL OF MACHINES THROUGH DETECTION OF GESTURES BY OPTICAL AND MUSCLE SENSORS

TECHNICAL FIELD

This disclosure relates to a system and method for controlling machines by detecting a person's gesture commands.

BACKGROUND

Often times, heavy material handling operations (e.g., industrial digging sites using a backhoe) involves the teamwork of at least two people to perform the operations. For example, a first person may be operating material handler equipment (e.g., a backhoe) and a second person may be acting as a spotter for the first person to call out and inform the first person of any conditions that the first person may not be aware of.

For some material handler operations, the operator and/or spotter may be required to undergo specialized training to operate the material handler equipment. The use of both the operator and the spotter increases the manpower requirement, and may thus stress the resources of an enterprise running material handling operations.

SUMMARY

According to an embodiment, a computing device including at least a communication interface and a processor is disclosed. The communication interface may be configured to receive gesture sensor data from a gesture detection device, the gesture sensor data including at least one gesture command, receive image data from an image recording device, the image data including a depiction of the at least one gesture command; and receive location information identifying a location of a material handler equipment included in the material handler system. The processor may be in communication with the communication interface. The processor may further be configured to determine a control command for controlling an operation of the material handler equipment based on the gesture sensor data and the image data, compare the location of the material handler equipment included in the location information with geo-fence parameters assigned to the material handler equipment, and control operation of the material handler equipment according to the control command when the location of the material handler equipment is determined to be within the geo-fence parameters.

DETAILED DESCRIPTION

The discussion below makes reference to a material handler system that includes gesture command recognition for controlling operation of material handler equipment included in the material handler system. The system may include two or more sensors for detecting the person's gesture commands, and circuitry for recognizing the gesture commands and implementing a safeguarding strategy that determines when to enable control over the machines based on predetermined safety conditions. Without the gesture command recognition capability, the material handler system may require both an operator agent situated in the material handler equipment for directly operating the material handler equipment, and also a spotter agent located outside of the material handler equipment for providing spotting communications to the operator. The spotting communications may inform the operator of environmental and/or safety conditions that are not viewable by the operator.

With the gesture command recognition, the material handler system may not require the operator described above. For example, the agent located outside of the material handler equipment (i.e., the spotter) described above may be equipped with gesture command devices that enables the agent to control operation of the material handler equipment without further inputs from an operator inside of the material handler equipment. This way, a single agent located outside of the material handler equipment may wear a gesture command device and control operation of the material handler equipment with gesture commands. This does away with the need for an operator seated within the material handler equipment.

With these enhanced technological capabilities, the gesture command capabilities improve the material handler system by reducing a number of human agents needed to operate the material handler equipment. With the enhanced gesture command capabilities, a single agent equipped with the gesture command device described herein and located outside of the material handler equipment, may control operation of the material handler equipment remotely. The material handler equipment may be heavy machinery such as, for example, a backhoe, excavator, or tractor.

Figure 1:
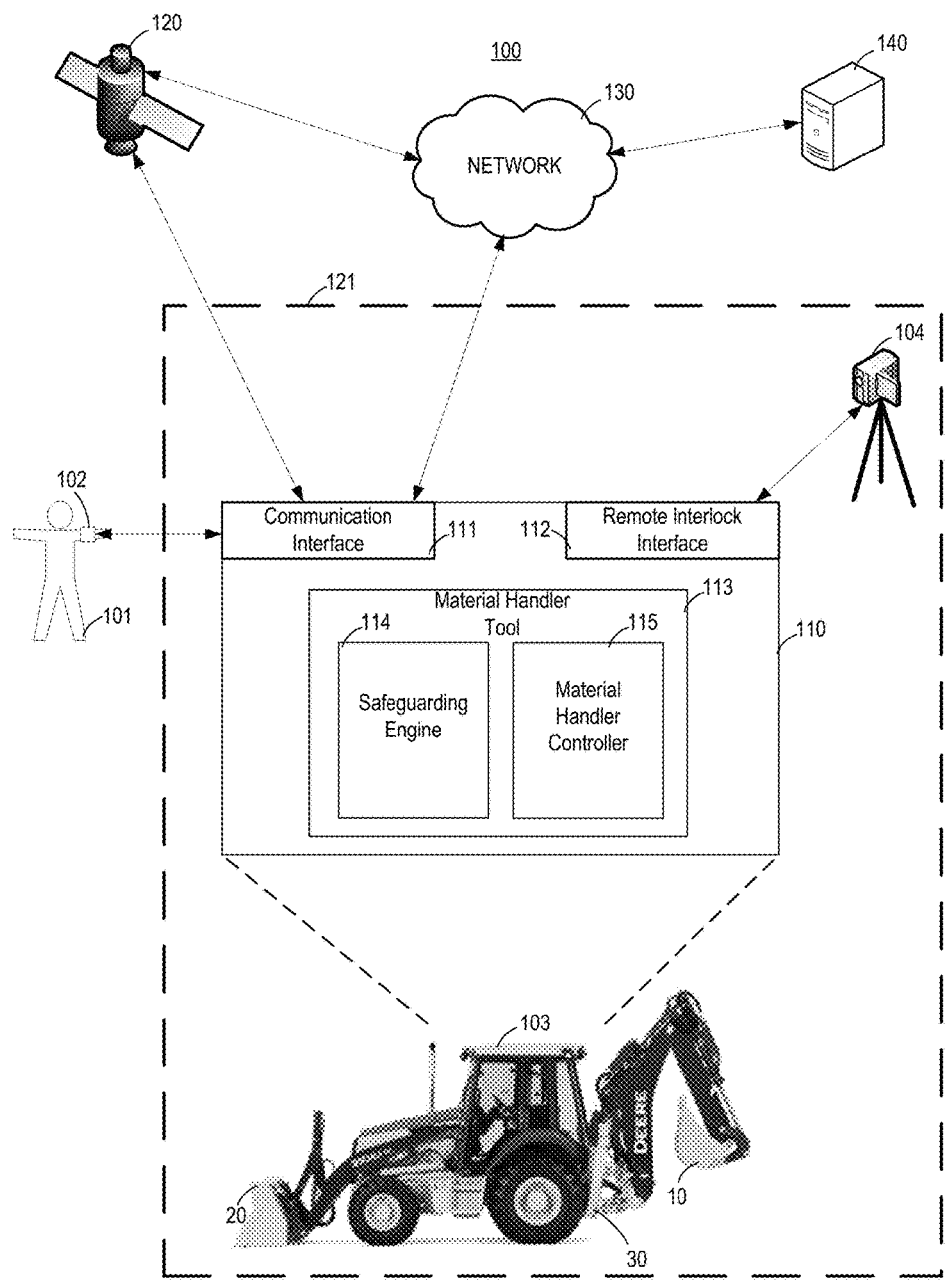
FIG. 1 shows an exemplary material handler system.

FIG. 1 shows an exemplary material handler system 100 that includes material handler equipment 103, a gesture detection device 102 worn by an agent 101, and an image recording device 104. A computing device 110 may be installed on the material handler equipment 103, where the computing device 110 includes a communication interface 111, a remote interlock interface 112, and a material handler tool 113 that includes a safeguarding engine 114 and a material handler controller 115. A more detailed description of the computer architecture that comprises the computing device 110 is provided with reference to the computer system 200 in FIG. 2. Another agent is not seated within the material handler equipment 103. The material handler equipment 103 shown in FIG. 1 and described herein may be a backhoe that includes a bucket 10, a loader 20, and stabilizer legs 30, amongst other backhoe components.

The gesture detection device 102 may be a wrist band, watch, or other wearables that include muscle sensors for detecting muscle movements and activations that may be interpreted as specific gesture commands by the material handler tool 113. For example, the muscle sensors on the gesture detection device 102 may include electrodes for detecting the movement and/or activation of specific muscles on the body. The electrodes may be medical grade stainless steel electromyography (EMG) sensors for detecting the contraction of muscles on a user wearing the gesture detection device 102. The gesture detection device 102 may further include one or more gyroscopes, one or more accelerometers, and/or one or more magnetometers. The gesture detection device 102 may be a wearable device for sensing movements of a wearer and/or muscle activation of the wearer. For example, the gesture device 102 may be a Myo™ wearable gesture control and motion control device in the form of an armband. The gesture detection device 102 may further include a GPS transceiver so that the GPS 120 may locate the gesture detection device 102.

The muscle detection information describing the muscle movements and/or muscle activations may be transmitted by the gesture detection device 102 to the computing device 110. Once received, the material handler tool 113 running on the computing device 110 may analyze the muscle detection information and interpret the muscle movements and/or muscle activations to correspond to a specific body movement. The material handler tool 113 may further match up the interpreted body movement to a predefined gesture command. Alternatively, portions of the material handler tool 113 may be running on the gesture detection device 102 directly such that the muscle detection information may be analyzed by the material handler tool 113 running on the gesture detection device 102. According to such embodiments, the gesture detection device 102 may then interpret the body movement, match the interpreted body movement to a gesture command, and transmit the gesture command to the computing device 110.

Figure 6:
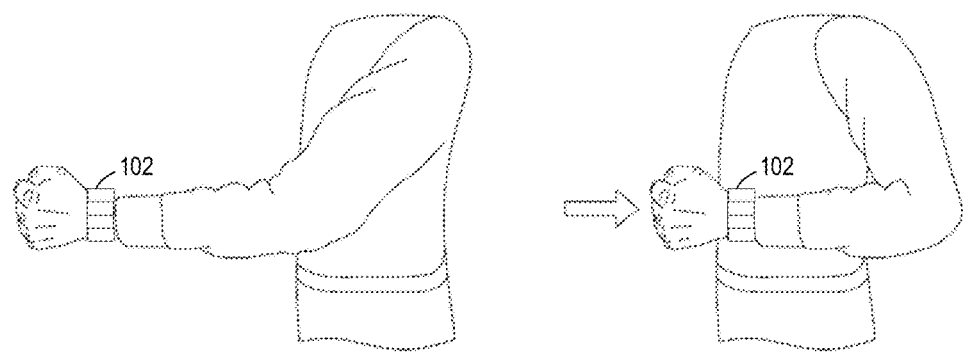
FIG. 6 shows a first exemplary gesture command.
Figure 7:
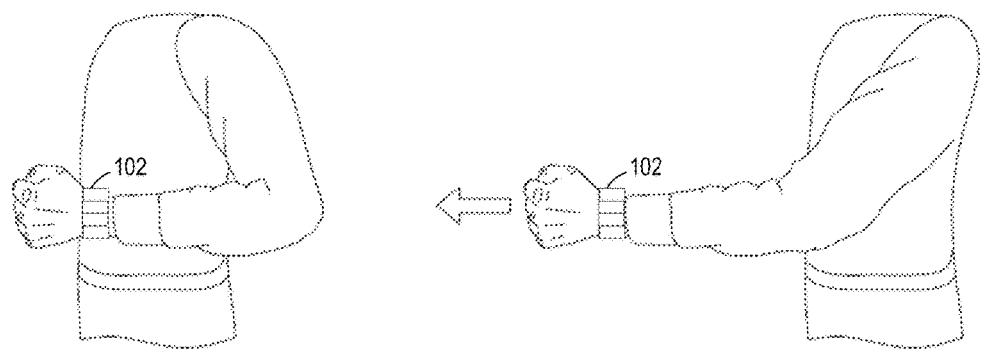
FIG. 7 shows a second exemplary gesture command.
Figure 8:
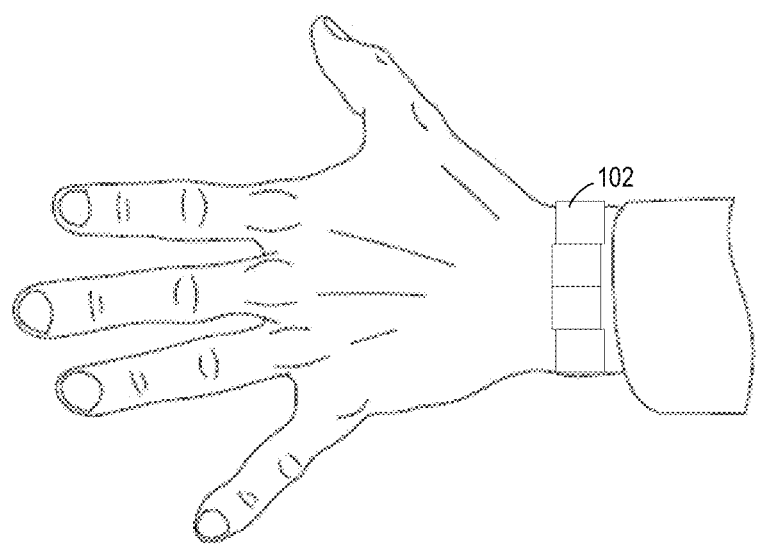
FIG. 8 shows a third exemplary gesture command.
Figure 9:
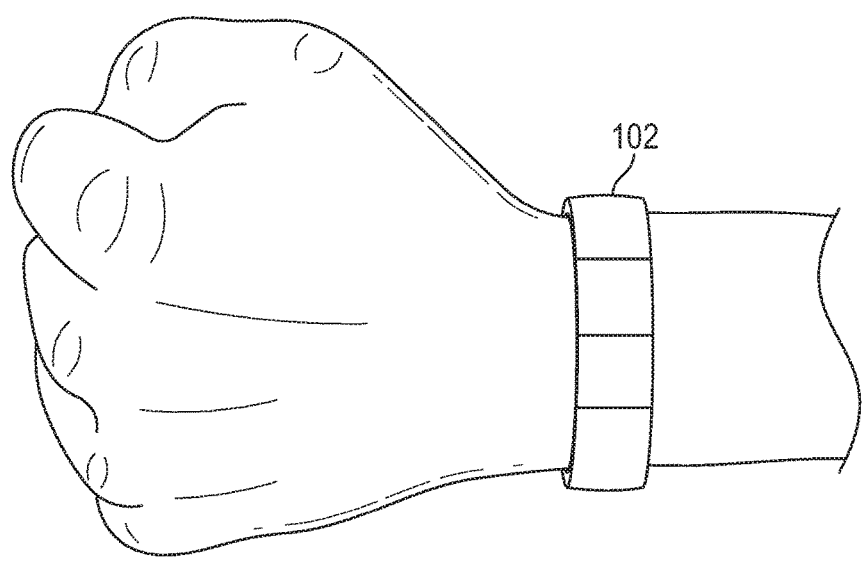
FIG. 9 shows a fourth exemplary gesture command.
Figure 10:
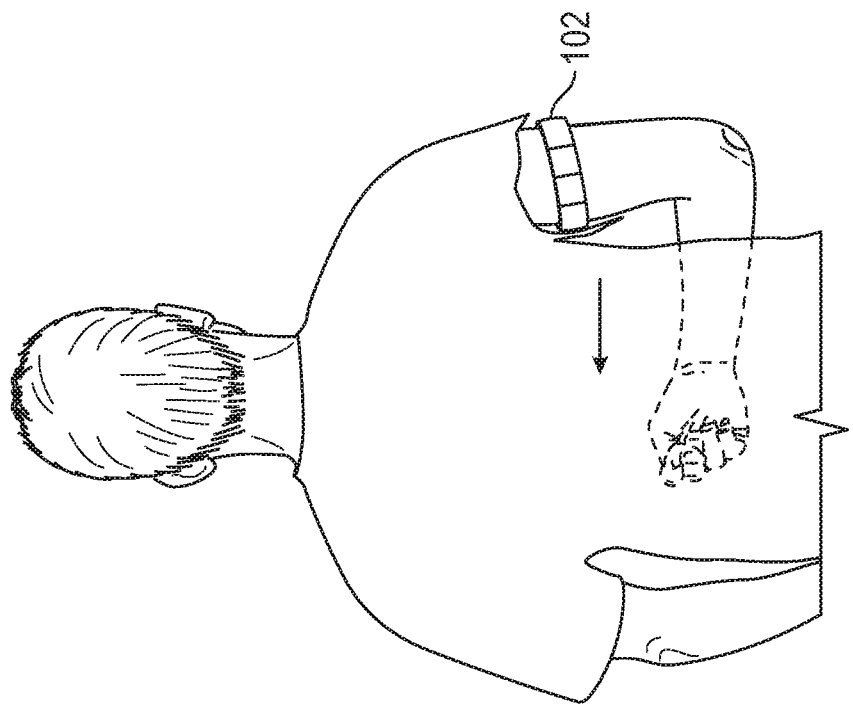
FIG. 10 shows a fifth exemplary gesture command.
Figure 10:
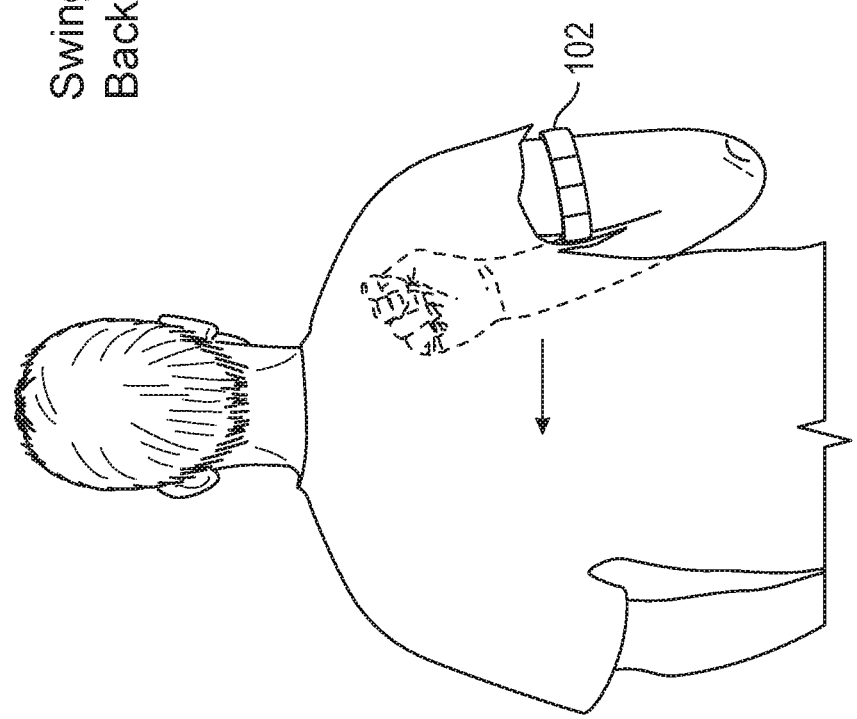
Figure 11:
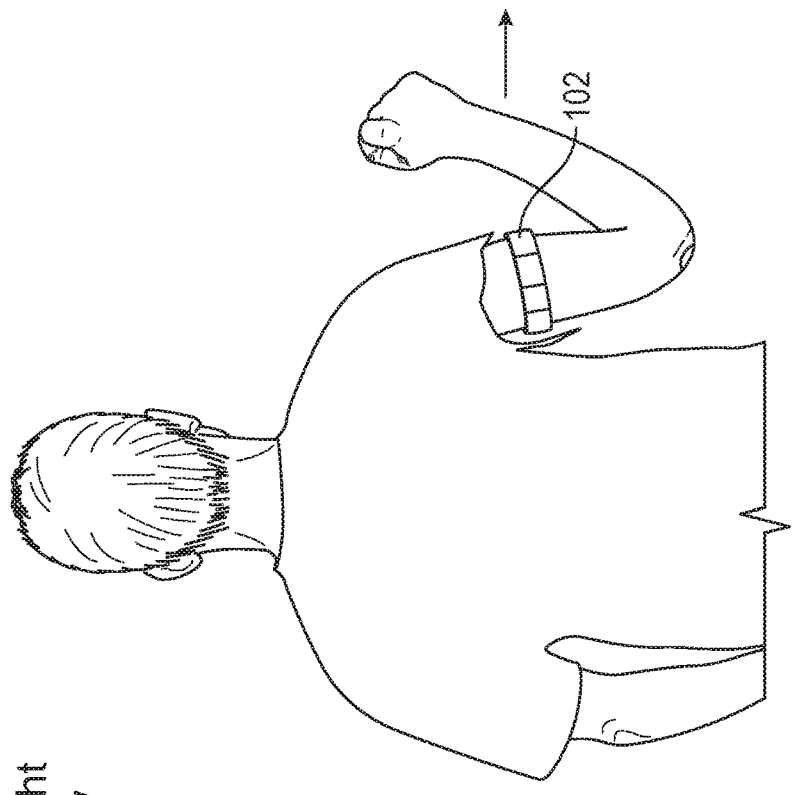
FIG. 11 shows a sixth exemplary gesture command.
Figure 11:
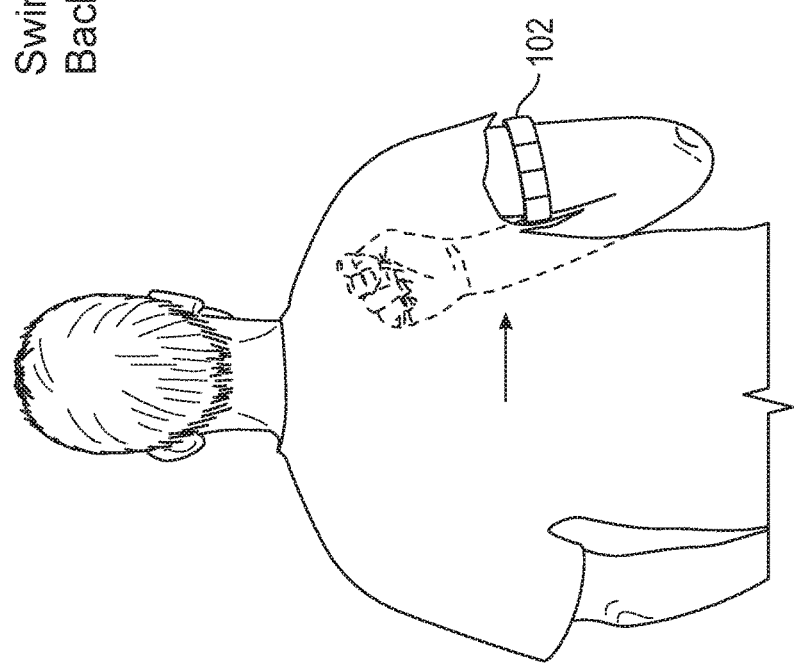
Figure 12:
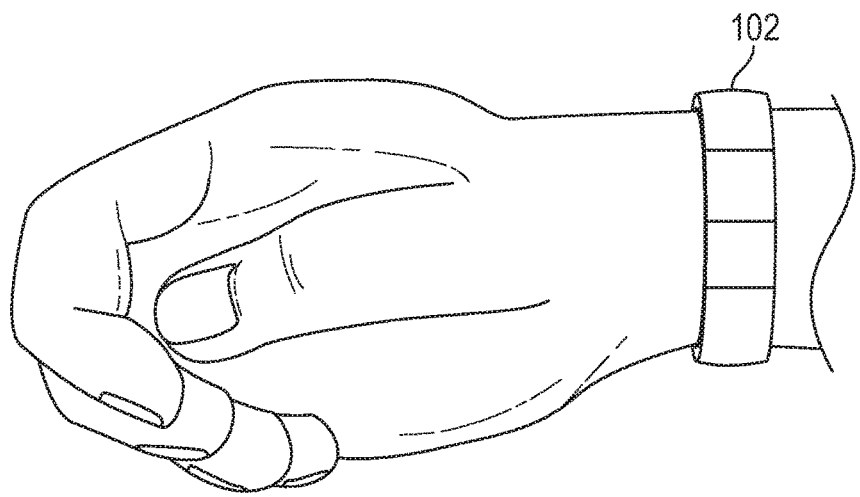
FIG. 12 shows a seventh exemplary gesture command.
Figure 13:
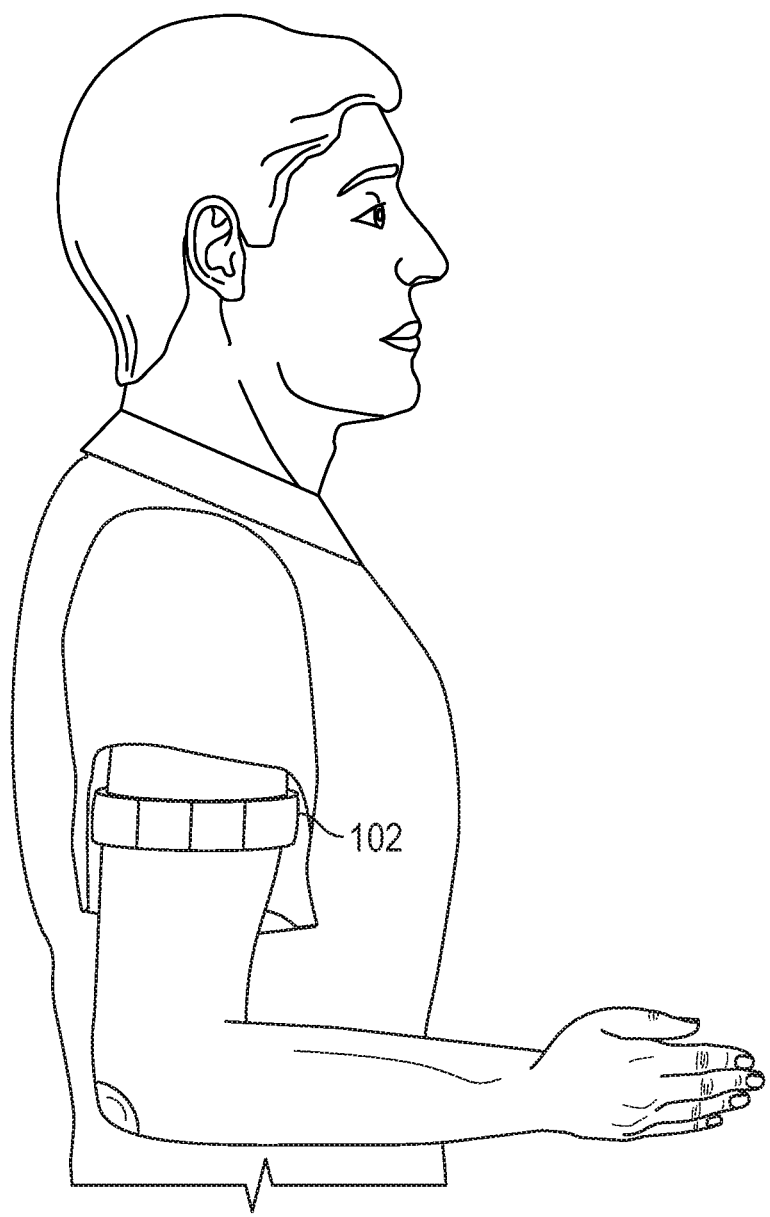
FIG. 13 shows an eighth exemplary gesture command.

Examples of body movements that may be used as gesture commands are provided in FIGS. 6-12. FIG. 6 shows an exemplary pull-in gesture command. FIG. 7 shows an exemplary push-out gesture command. FIG. 8 shows an exemplary closed fist gesture command. FIG. 9 shows an exemplary open hand gesture command. FIGS. 6-9 and 12 show the gesture detection device 102 worn on and in skin-contact with an agent's wrist, while FIGS. 10-11 and 13 shows the gesture detection device 102 worn underneath an agent's clothing around a bicep region (in skin-contact). The gesture detection device 102 may also be worn in skin-contact at other locations such as an agent's forearm. FIG. 10 shows a swing left gesture command. FIG. 11 shows a swing right gesture command. FIG. 12 shows a hand at rest gesture command. FIG. 13 shows an arm at rest gesture command.

For exemplary purposes, a closed fist (e.g., closed fist gesture command shown in FIG. 8) may be a gesture command for closing the bucket on the material handler equipment 103, an open hand (e.g., open hand gesture command shown in FIG. 9) may be a gesture command for opening the bucket on the material handler equipment 103, hands resting on the agent's 101 waist may be a gesture command for keeping the material handler equipment 103 still, swinging an arm from the agent's 101 waist to the right (e.g., swing right gesture command shown in FIG. 11) in a plane may be a gesture command for swinging the bucket on the material handler equipment 103 to the right, swinging an arm from the agent's 101 waist to the left in a plane (e.g., swing left gesture command shown in FIG. 10) may be a gesture command for swinging the bucket on the material handler equipment 103 to the left, the arm pull-in movement (e.g., pull-in gesture command shown in FIG. 6) may be a gesture command for retracting the bucket on the material handler equipment 103 back in, and the arm pull-out movement (e.g., push-out gesture command shown in FIG. 7) may be a gesture command for extending the bucket on the material handler equipment 103 out.

The image recording device 104 may capture one or more still digital images, or record a sequence of one or more digital images such as digital image data, within a field of view of the image recording device 104. The material handler system 100 may be set-up such that the field of view includes both the agent 101 providing the gesture commands, and the material handler equipment 103. According to some embodiments, the image recording device 104 may further include distance measuring equipment for measuring a distance between the agent 101 and the material handler equipment 103, such as lidar-based distance measuring equipment, radar-based distance measuring equipment, or sonar-based distance measuring equipment. The distance measurement between the agent 101 and the material handler equipment 103 may be referenced to ensure the agent 101 remains a safe distance away from the material handler equipment 103. For example, the computing device 110 may control operation of the material handler equipment 103 to cease movement of one or more actuators when the distance between the agent 101 and the material handler equipment 103 is determined to be less than a predetermined threshold distance.

The material handler equipment 103, the gesture detection device 102, and the image recording device 104 may be located within a geo-fence 121 as defined and identified by a Global Positioning Satellite (GPS) 120. The geo-fence 121 may be a predetermined area that defines a boundary in which mechanical and electrical (i.e., non-human) components of the material handler system 100 are designated to operate in. For example, the image recording device 104 and the material handler equipment 103 may be positioned within the material handler system 100 to operate within geo-fence 121. Likewise, gesture detection device 102 that is worn by the human agent 101 may be positioned to operate outside of the geo-fence 121. Information on the agent's 101 location and the geo-fence 121 may be referenced by the computing device 110 to keep the agent 101 outside of the geo-fence 121. For example, the computing device 110 may control operation of the material handler equipment 103 to cease movement of one or more actuators when the agent 101 (i.e., the gesture detection device 102) is determined to be within the geo-fence 121.

The material handler system 100 may further include a command control server 140, where the computing device 110 installed on the material handler equipment 103 may rely on the command control server 140 to accomplish, at least in part, some of the processes and analyses allocated to the material handler tool 113 described herein. For example, certain processes that require large processing power capabilities such as image recognition for recognizing the agent's 101 movements from image data captured by the image recording device 104 may be processed, at least in part, on the command control server 140.

The GPS 120 may communicate with the computing device 110 directly through the communication interface 111. The GPS 120 and the command control server 140 may further communication with the computing device 110 through the communication interface 111, via a network 130. The network 130 may be one or more of the following: a local area network; a wide area network; or any other network (such as a cellular communication network) that enables communication of data between computing communication devices. In one embodiment, network 130 may support wireless communications. Alternatively, or in addition, the network 130 may support hard-wired communications, such as a telephone line or cable. The network 130 may also support the Ethernet IEEE (Institute of Electrical and Electronics Engineers) 802.3x specification. The network 130 may be the Internet and may support IP (Internet Protocol). The network 130 may be a LAN or a WAN. The network 130 may be a hotspot service provider network. The network 130 may be an intranet. The network 130 may be a GPRS (General Packet Radio Service) network. The network 130 may be any appropriate cellular data network or cell-based radio network technology. The network 130 may be an IEEE 802.11 wireless network or any suitable network or combination of networks. Although one network 130 is shown in FIG. 1, the network 130 may be representative of any number of networks (of the same or different types) that may be utilized.

In addition to communicating through the network 130, the components within the material handler system 100 may communicate directly with each other via wireless communication protocols such as Bluetooth, NFC (near field communication), and connection to a common WiFi network. For example, the gesture detection device 102 may communicate directly with the computing device 110 through the communication interface 111. The image recording device 104 may further communicate directly with the computing device 110 through the remote interlock interface 112. For example, image data and/or distance measurement information obtained by the image recording device 104 may be communicated to the computing device 110 through the remote interlock interface 112. A more detailed description of the computing device 110 is provided with reference to FIG. 2.

Figure 2:
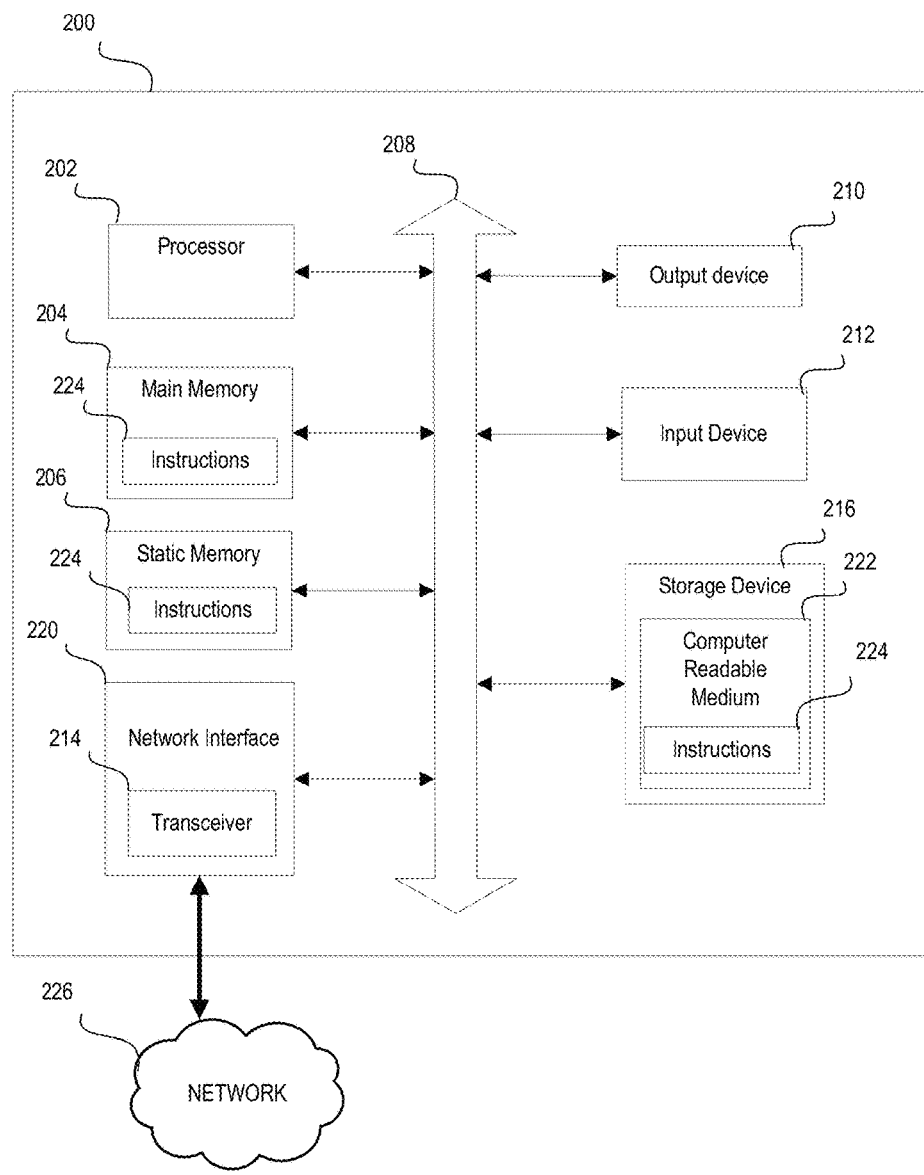
FIG. 2 shows exemplary computer architecture for a computer system.

One or more of the computing devices in the material handler system 100 may include one or more components described by the exemplary computer architecture of computer system 200 in FIG. 2.

Computer system 200 includes a network interface 220 that allows communication with other computers via a network 226, where network 226 may be represented by network 130 in FIG. 1. Network 226 may be any suitable network and may support any appropriate protocol suitable for communication to computer system 200. The computer system 200 may also include a processor 202, a main memory 204, a static memory 206, an output device 210 (e.g., a display or speaker), an input device 212, and a storage device 216, communicating via a bus 208.

Processor 202 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 202 executes instructions 224 stored on one or more of the main memory 204, static memory 206, or storage device 216. Processor 202 may also include portions of the computer system 200 that control the operation of the entire computer system 200. Processor 202 may also represent a controller that organizes data and program storage in memory and transfers data and other information between the various parts of the computer system 200.

Processor 202 is configured to receive input data and/or user commands through input device 212. Input device 212 may be a keyboard, mouse or other pointing device, trackball, scroll, button, touchpad, touch screen, keypad, microphone, speech recognition device, video recognition device, image recognition device, accelerometer, gyroscope, global positioning system (GPS) transceiver, or any other appropriate mechanism for the user to input data to computer system 200 and control operation of computer system 200. Input device 212 as illustrated in FIG. 89 may be representative of any number and type of input devices.

Processor 202 may also communicate with other computer systems via network 226 to receive instructions 224, where processor 202 may control the storage of such instructions 224 into any one or more of the main memory 204 (e.g., random access memory (RAM)), static memory 206 (e.g., read only memory (ROM)), or the storage device 216. Processor 202 may then read and execute instructions 224 from any one or more of the main memory 204, static memory 206, or storage device 216. The instructions 224 may also be stored onto any one or more of the main memory 204, static memory 206, or storage device 216 through other sources. The instructions 224 may correspond to, for example, instructions and/or operational commands for implementing the material handler tool 113.

Although computer system 200 is represented in FIG. 2 as a single processor 202 and a single bus 208, the disclosed embodiments applies equally to computer systems that may have multiple processors and to computer systems that may have multiple busses with some or all performing different functions in different ways.

Storage device 216 represents one or more mechanisms for storing data. For example, storage device 216 may include a computer readable medium 222 such as read-only memory (ROM), RAM, non-volatile storage media, optical storage media, flash memory devices, and/or other machine-readable media, or any other appropriate type of storage device. Although only one storage device 216 is shown, multiple storage devices and multiple types of storage devices may be present. Further, although computer system 200 is drawn to contain the storage device 216, it may be distributed across other computer systems that are in communication with computer system 200, such as a computer system in communication with computer system 200. For example, when computer system 200 is representative of the computing device 110, storage device 216 may be distributed across to include memory on the command control server 140.

Output device 210 is configured to present information to the user. For example, output device 210 may be a display such as a liquid crystal display (LCD), a gas or plasma-based flat-panel display, or a traditional cathode-ray tube (CRT) display or other well-known type of display in the art of computer hardware. Accordingly, output device 210 may be a device for displaying a user interface. In addition or alternatively, output device 210 may be a speaker configured to output audible information to the user. In addition or alternatively, output device 210 may be a haptic output device configured to output haptic feedback to the user. Any combination of output devices may be represented by the output device 210.

Network interface 220 provides the computer system 200 with connectivity to the network 226 through any compatible communications protocol. Network interface 220 sends and/or receives data from the network 226 via a wireless or wired transceiver 214. Transceiver 214 may be a cellular frequency, radio frequency (RF), infrared (IR) or any of a number of known wireless or wired transmission systems capable of communicating with network 226 or other computer device having some or all of the features of computer system 200. Bus 208 may represent one or more busses, e.g., USB, PCI, ISA (Industry Standard Architecture), X-Bus, EISA (Extended Industry Standard Architecture), or any other appropriate bus and/or bridge (also called a bus controller). Network interface 220 as illustrated in FIG. 2 may be representative of the communication interface 111 and/or the remote interlock interface 112.

Computer system 200 may be implemented using suitable hardware, software and/or circuitry, such as a personal computer or other electronic computing device. In addition, computer system 200 may also be a portable computer, laptop, tablet or notebook computer, PDA, pocket computer, appliance, telephone, server computer device, or mainframe computer.

Figure 3:
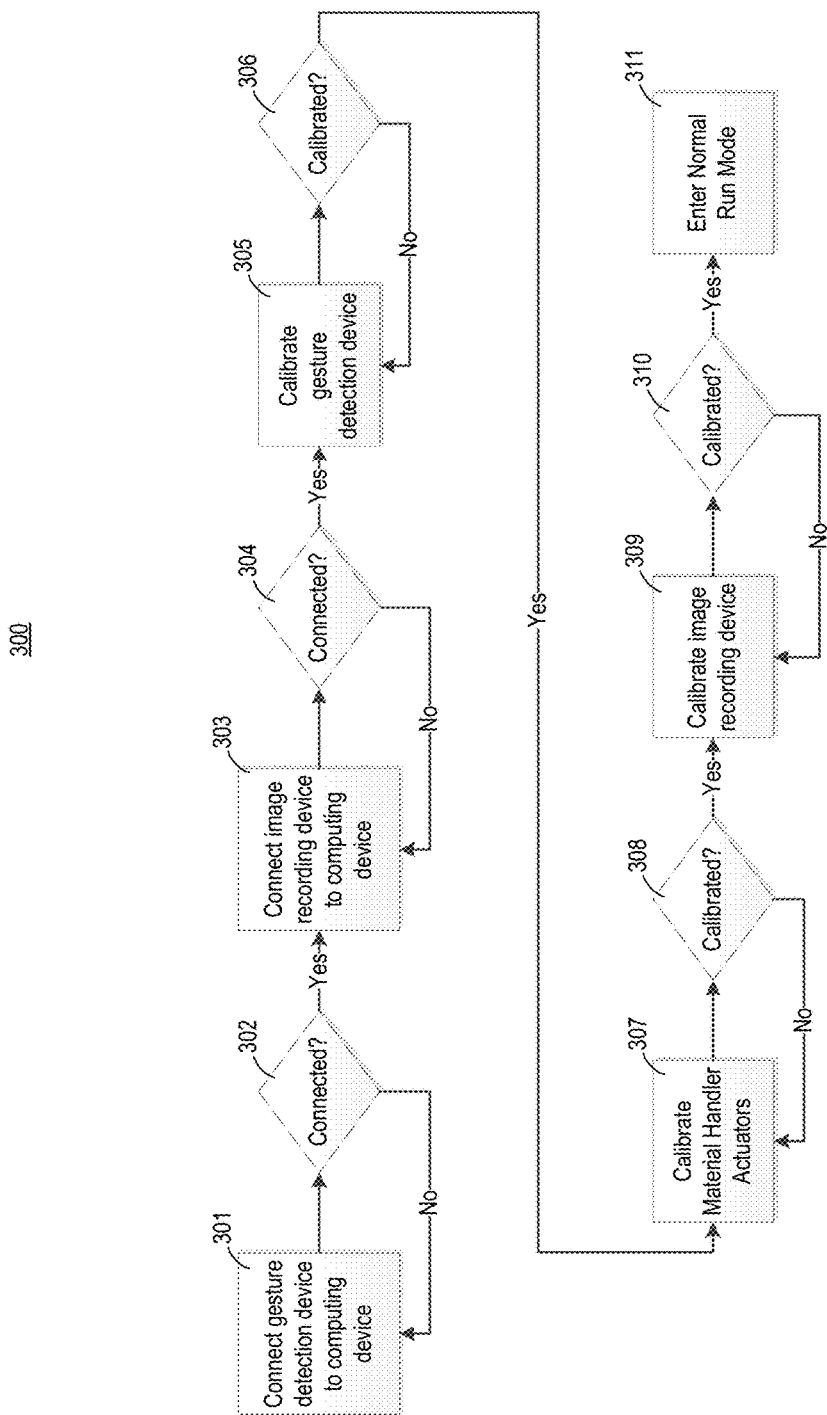
FIG. 3 shows a flow chart of logic describing an exemplary process for initializing and calibrating the material handler system.

FIG. 3 shows an exemplary flow diagram 300 of logic describing an exemplary process for initializing and calibrating components of the material handler system 100. The process for initializing and calibrating the material handler system 100 may be implemented by, for example, the material handler tool 113 running on the computing device 110.

The gesture detection device 102 initially connects to the computing device 110 (301). For example, the gesture detection device 102 may transmit a connection request signal to the computing device 110, where the connection request signal includes device identification information describing the gesture detection device 102, as well as a request to connect the gesture detection device 102 with the computing device. The connection request signal may further include authentication information for authenticating the gesture detection device 102 to connect with the computing device 110.

Upon receiving the connection request from the gesture detection device 102, the computing device 110 may determine whether to allow connection of the gesture detection device 102 with the computing device 110 (302). For example, the computing device 110 may verify the gesture detection device 102 is allowed to connect with the computing device 110 by comparing the device identification information with a list of pre-authorized device identifiers. When the device identification information matches a pre-authorized device identifier, the gesture detection device 102 may be allowed to connect with the computing device 110. When the connection request includes authentication information, the authentication information may further be analyzed such that the gesture detection device 102 is allowed to connect with the computing device 110 when the authentication information is authenticated. If the gesture detection device 102 is not allowed to connect with the computing device 110, the material handler tool 113 reverts the process back (301).

After the gesture detection device 102 is allowed to connect with the computing device 110 (302), the material handler tool 113 proceeds to a process for connecting the image recording device 104 to the computing device 110 (303). For example, the image recording device 104 may transmit a connection request signal to the computing device 110, where the connection request signal includes device identification information describing the image recording device 104, as well as a request to connect the image recording device 104 with the computing device. The connection request signal may further include authentication information for authenticating the image recording device 104 to connect with the computing device 110. Connecting the image recording device 104 may also include initializing (e.g., enabling functionality of) a remote interlocking switch. The remote interlocking switch may be a computerized switch for enabling, and disabling, operation of the actuators on the material handler equipment 103 based on a detected location of the agent 101 relative to the geo-fence 121, and/or based on a detected location of the material handler equipment 103 and/or image recording device 104 within the geo-fence 121.

Upon receiving the connection request from the image recording device 104, the computing device 110 may determine whether to allow connection of the image recording device 104 with the computing device 110 (303). For example, the computing device 110 may verify the image recording device 104 is allowed to connect with the computing device 110 by comparing the device identification information with a list of pre-authorized device identifiers. When the device identification information matches a pre-authorized device identifier, the image recording device 104 may be allowed to connect with the computing device 110. When the connection request includes authentication information, the authentication information may further be analyzed such that the image recording device 104 is allowed to connect with the computing device 110 when the authentication information is authenticated. If the image recording device 104 is not allowed to connect with the computing device 110, the material handler tool 113 reverts the process back (303).

After the image recording device 104 is allowed to connect with the computing device 110 (304), the material handler tool 113 proceeds to calibrate the gesture detection device (305). The gesture detection device 102 may be calibrated independently, or by communicating calibration information back and forth with the computing device 110. The calibration process may include calibration of the sensors, accelerometers, gyroscopes, and/or magnetometers included on the gesture detection device 102. Once calibrated, the gesture detection device 102 may transmit a calibration signal to the computing device 110, where the calibration signal indicates the gesture detection device 102 has been successfully calibrated. If the gesture detection device 102 is not successfully calibrated, the gesture detection device 102 may continue efforts to calibrate by reverting back (305).

After the gesture detection device 102 is successfully calibrated (306), the material handler tool 113 proceeds to calibrate actuators on the material handler equipment 103 (307). The material handler actuators may include the bucket, the loader, and the stabilizer legs that are components when the material handler equipment 103 is a backhoe. Once calibrated, the material handler equipment 103 may generate a calibration signal to indicate to the material handler tool 113 that the actuators have been successfully calibrated. If the material handler actuators are not calibrate successfully, the material handler equipment 103 may continue efforts to calibrate by reverting back (307).

After the material handler actuators are successfully calibrated (308), the image recording device 104 may be calibrated (309). The calibration of the image recording device 104 may include calibrating a field of view, focus, and image characteristics of the image recording device 104 to ensure a scene including the agent 101 and/or the material handler equipment 103 is captured by the image recording device 104. Once calibrated, the image recording device 104 may generate a calibration signal indicating the image recording device 104 has been successfully calibrated, and transmit the calibration signal to the computing device 110. If the image recording device 104 is not calibrate successfully, the image recording device 104 may continue efforts to calibrate by reverting back (309).

After the image recording device 104 is successfully calibrated (310), the material handler tool 113 may proceed to implement a normal run mode for operating the material handler equipment 103 (311).

Figure 4:
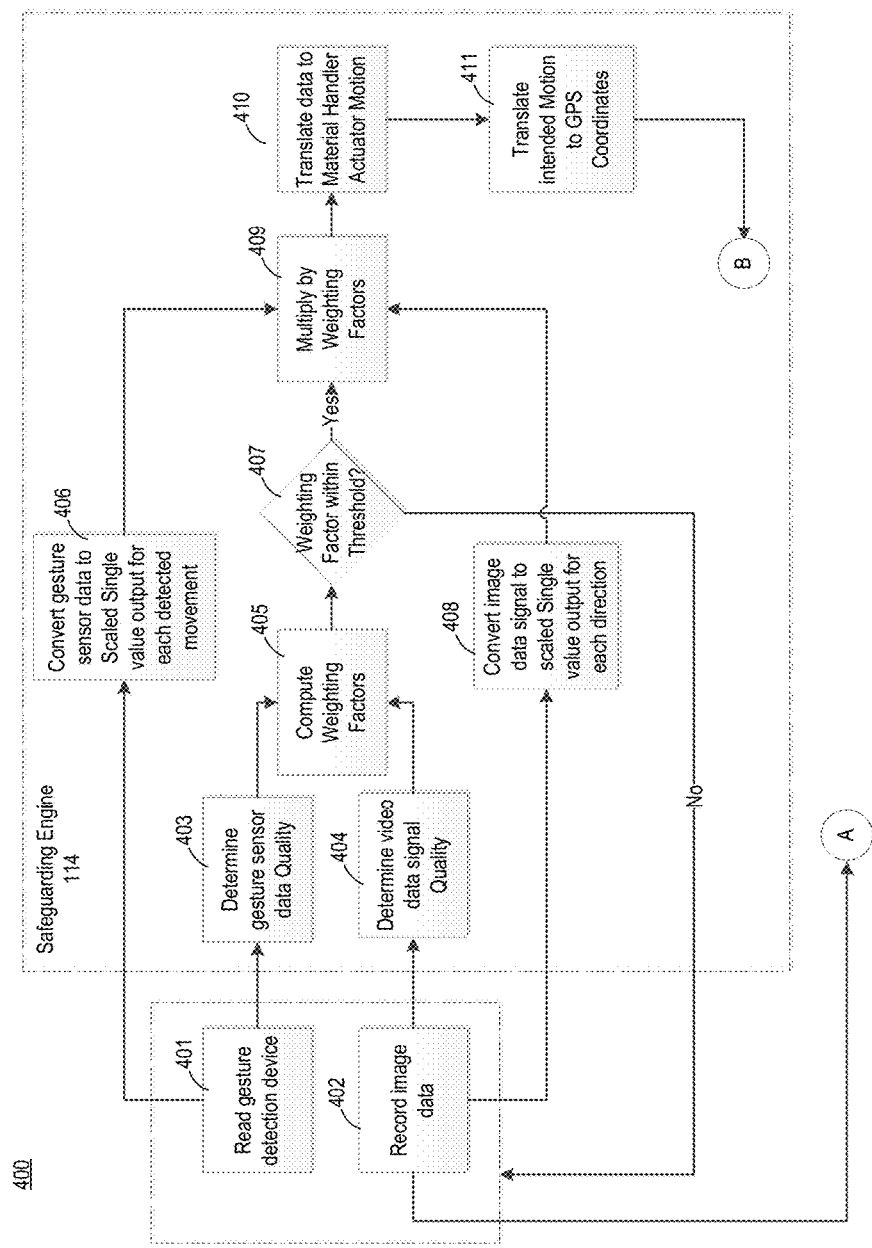
FIG. 4 shows a flow chart of logic describing an exemplary process for implementing a normal operational mode of the material handler system.

FIG. 4 shows an exemplary flow diagram 400 of logic describing an exemplary process for operating the material handler equipment 103 under a normal run mode. The process for operating the material handler equipment 103 under the normal run mode may be implemented by, for example, the material handler tool 113 running on the computing device 110.

Movements made by the agent 101 may be detected by the gesture detection device 102 and transmitted to the computing device (401). For example, muscle contractions may be detected by EMG sensors, orientations of the agent's 101 body parts may be detected by gyroscopes, acceleration movements may be detected by accelerometers, and/or magnetic field strength measurements may be detected by a magnetometers of the gesture detection device 102. In particular, gesture sensor data describing the movements and other detected measurements by the gesture detection device 102 may be transmitted to the computing device 110. The gesture sensor data may be received by the computing device 110 through the communication interface 111.

Once received, the material handler tool 113 may determine a quality of the gesture sensor data. The material handler tool 113 may determine the quality of the gesture sensor data by evaluating such characteristics of the agent's 101 movements such as the speed and displacement of the detected movements. The material handler tool 113 may further evaluate the connection quality of the received gesture sensor data by comparing signal information and latency times. The material handler tool 113 may further evaluate diagnostic information from the gesture detection device 102. By evaluating the information included in the gesture sensor data, the material handler tool 113 determines a quality factor to assign to the gesture sensor data. The quality factor may then be applied at a later step.

In addition, the image recording device 104 may record image data capturing movements of the agent 101. The movements may include one or more gesture commands. The recorded image data may be transmitted to the computing device 110 through the remote interlock interface 112.

Once received, the material handler tool 113 may determine a quality of the image data (404). The material handler tool 113 may determine the quality of the image data by evaluating such things as whether or not a signal including the image data is being received (e.g., there may not be successful receipt of an image data signal in cases of weather issues such as fog, high winds, or rain). The material handler tool 113 may determine the quality of the image data by evaluating whether the image data includes viewable images that depict the agent 101 and/or the material handler equipment 103 clearly (e.g., evaluating image quality). The material handler tool 113 may determine the quality of the image data by evaluating the speed and displacement of the agent's 101 movements as recognized from the image data. The material handler tool 113 may determine the quality of the image data by evaluating an intensity of the image characteristics of the image data (e.g., in low and high light conditions the images in the image data may be attenuated). The material handler tool 113 may determine the quality of the image data by evaluating a comparative distance of the image data (e.g., should the distance from start to finish of the signal change significantly, this may indicate interference or other condition giving a false reading). By evaluating the information included in the image data, the material handler tool 113 determines a quality factor to assign to the image data. The quality factor may then be applied at a later step.

After determining the quality factor to assign to the gesture sensor data and the quality factor to assign to the image data, the material handler tool 113 may compute weighting factors for both the gesture sensor data and the image data based on their respective assigned quality factors (405). The weighting factors will be used to determine the fused output of the two input signals (gesture sensor data and image data) that will be eventually sent to the material handler controller 115. The weighting factors will take into account the signal quality as well as the movement type described and/or detected by the gesture sensor data and the image data. For example, should the signal quality for the gesture sensor data be determined to be excellent and the movement type small and fine, then the gesture sensor data weighting factor may be generated to be larger than the image data weighting factor. Should the image data quality be determined to be excellent and the movement be large and gross, then the image data weighting factor may be larger than the gesture sensor data weighting factor. In the case where an input signal is determined not to have been received, or the quality of the input signal is near 0, the other input signal may be granted 100% weighting. The weighting factors may be applied at a later step.

The gesture sensor data may be converted to a scaled single value output for each movement detected by the gesture detection device 102 (406).

The image data may be converted to a scaled single value output for each direction detected by the image recording device 104 (408).

The material handler tool 113 may implement an error checking process on the weighting factors (407). The error checking process may include looking for potential errors in the weighting factors such as identifying weighting factors greater than 100%, making sure each individual weighting factor is not greater than 100%, and making sure the sum of each individual weighting factor adds up to 100% (is not larger than 100%). When the error checking process is not satisfied, the material handler tool 113 reverts the process back (401 and 402).

When the error checking process is successfully satisfied, the material handler tool 113 multiplies each scaled single value output from the gesture sensor data and the image data, by their respective weighting factors (409).

The material handler tool 113 may then combine the values from both the gesture sensor data and the image data and recognize a movement by the agent 101 based on the weighted gesture sensor data and the weighted image data (410). By recognizing the movement described by the weighted gesture sensor data and the weighted image data, the material handler tool 113 may then match the recognized movement to a gesture command. The material handler tool 113 may further translate the gesture command to a material handler actuator motion described as being controlled by the gesture command. Image data may be analyzed using image data processing techniques such as color differentiation to distinguish the pixels depicting the agent 101 from pixels depicting background objects. The image data may further be analyzed using image processing (e.g., Hough transform) to detect linear boundaries or curved boundaries of arms and fingers depicted within the image data compared against background pixels. A cloud of pixels may be used to model the position of the arms and/or fingers depicted by the image data, where the positioning of the arms and/or fingers depicted by the image data may be compared against reference gestures including arms and/or fingers for the same agent 101 or a model agent. In terms of the gesture sensor data, the electrical signals detected by the gesture detection device 102 from the muscles are matched against stored patterns of muscle activation signals that are known to correspond to known reference positioning of arms and/or fingers, reference body movements, and/or reference gestures by the agent 101 or a model agent.

The material handler tool 113 may translate the gesture command into corresponding movement of actuators on the material handler equipment 103 (411). For example, the gesture command may be translated to correspond to moving the bucket 10 actuator up by 5 ft. The actual translation for moving the bucket 10 actuator up by 5 ft may correspond to moving the bucket 10 actuator from its current GPS coordinate to a new GPS coordinate that is 5 ft. above. It follows that the movement of the actuators of the material handler equipment 103 translated from the gesture command may be in terms of moving the actuator specified by the gesture command to different GPS coordinates.

Figure 5:
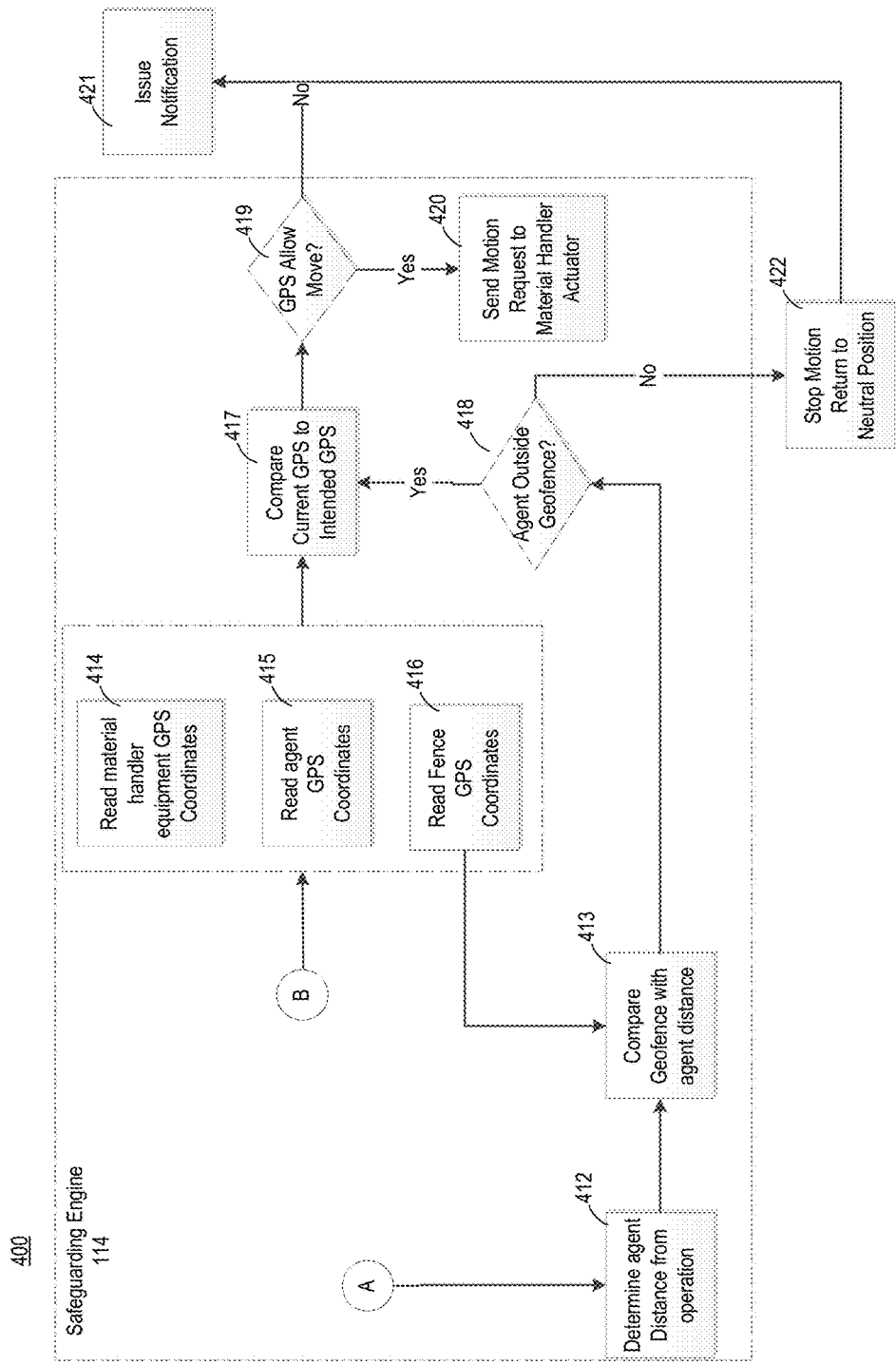
FIG. 5 shows a continuation of the flow chart of logic shown in FIG. 4.

FIG. 5 shows a continuation of the flow diagram 400 of logic describing the exemplary process for operating the material handler equipment 103 under the normal run mode.

The material handler tool 113 may verify the current GPS coordinates of one or more components that are included in the material handler system 100. For example, the GPS coordinates of the gesture detection device 102, image recording device 104, and/or the material handler equipment 103 may be obtained and verified by the GPS 120 (414). GPS coordinates for the agent 101 (by way of detecting the location of the gesture detection device 102) may also be determined (415). A predefined fence region (e.g., geo-fence 121) may be defined as an area where the material handler equipment 103 should operate in, and the agent 101 should not be inside of (416). So when the material handler equipment 103 is detected to be outside of the geo-fence 121, or when the agent 101 (by way of detecting the location of the gesture detection device 102) is detected to be inside of the geo-fence 121, further operation of the material handler equipment 103 may be ceased. In addition, the geo-fence 121 may extend to a predetermined range surrounding the material handler equipment 103 itself in order to track the location of specific components of the material handler equipment 103. For example, the geo-fence 121 may be configured to extend to a predetermined depth into the ground below the material handler equipment 103. This way, the location of a the bucket 10 on the exemplary backhoe embodiment of the material handler equipment 103 may be tracked such that operation of the material handler equipment 103 may be ceased when the bucket 10 is determined to be located at a depth beyond the predetermined depth. By configuring the geo-fence 121 to track the location of the individual components of the material handler equipment 103, the agent 101 may have further back-up control settings to assist the material handler equipment 103 does not operating beyond predetermined safe boundaries.

To further aid in determining the location of the different components of the material handler system 100, a distance of the agent 101 from the current operation of the material handler equipment 103 may be determined (412). The distance may be measured, for example, by the image recording device 104 or determined based on GPS coordinates of the agent 101, the gesture detection device 102, and/or the material handler equipment 103. If the agent is determined to be too close (e.g., less than a predetermined threshold distance from the material handler equipment 103), the material handler tool 113 may also cease operation of the material handler equipment 103. The distance of the agent 101 from the current operation of the material handler equipment 103 may be compared with the verified location of the geo-fence 121 (413). If the agent is determined to be located within the geo-fence 121, the material handler tool 113 may further cease operation of the material handler equipment 103 (422).

The material handler tool 113 may determine whether the agent 101 is located outside of the geo-fence 121 (418). When the material handler tool 113 determines the agent 101 is located outside of the geo-fence 121, the material handler tool 113 may compare the obtained GPS coordinates from earlier and compare them against intended GPS coordinates for the different components of the material handler system 100 (417), and determine whether the comparison allows for the operational movement of the material handler equipment actuator corresponding to the gesture command (419).

When the comparison of the obtained GPS coordinates and the intended GPS coordinates for the different components of the material handler system 100 indicates the operational movement is allowed (e.g., agent 101 is outside of geo-fence 121, agent 101 is more than a predetermined threshold distance away from material handler equipment 103, and/or a component (e.g., bucket 10) of the material handler equipment 103 is beyond a predetermined depth or range), the material handler tool 113 may control the material handler equipment 103 to move the material handler equipment actuator according to the gesture command (420). When the material handler tool 113 determines the operational movement of the material handler equipment actuator corresponding to the gesture command should not be allowed (e.g., agent 101 is inside of geo-fence 121 and/or agent is less than a predetermined threshold distance away from material handler equipment 103), a notification may be issued that identifies the gesture command will not be implemented and describing reasons why (421).

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry. Various implementations have been specifically described. However, other implementations are also within the scope of this disclosure.

What is claimed is:

1. A computing device comprising:
    a data communication interface configured to:
        receive gesture sensor data from a gesture detection device, the gesture sensor data including at least one gesture command;
        receive image data from an image recording device, the image data including a depiction of the at least one gesture command; and
        receive location information identifying a location of a material handler equipment, wherein the material handler equipment is a separate device from the gesture detection device;
    a processor in communication with the communication interface, the processor configured to:
        determine a control command for controlling an operation of the material handler equipment based on the gesture sensor data and the image data;
        compare the location of the material handler equipment included in the location information with geo-fence parameters assigned to the material handler equipment,
        wherein the geo-fence parameters define a predetermined geographical area; and
        control operation of the material handler equipment according to the control command when the location of the material handler equipment is determined to be within the geo-fence parameters.

2. The computing device of claim 1, wherein the processor is further configured to:
    determine a quality factor for the gesture sensor data;
    apply gesture sensor data weighting factor to the gesture sensor data based on the determined quality factor for the gesture sensor data;
    determine a quality factor for the image data;
    apply an image data weighting factor to the image data based on the determined quality factor for the image data; and
    determine the control command based on the weighted gesture sensor data and the weighted image data.

3. The computing device of claim 2, wherein the quality factor for the gesture sensor data is determined based on a speed or displacement of a detected movement described by the gesture sensor data; and
    wherein the quality factor for the image data is determined based on an image quality of digital images included in the image data.

4. The computing device of claim 1, wherein the gesture detection device includes at least one of an electromyography sensor, an accelerometer, a gyroscope, or a magnetometer.

5. The computing device of claim 1, wherein the processor is further configured to:
    receive location information describing a location of an agent providing the at least one gesture command.

6. The computing device of claim 5, wherein the processor is further configured to:
    compare the location information to the geo-fence parameters;
    determine whether the agent is located within the geo-fence parameters based on the comparison; and
    in response to determining the agent is within the geo-fence parameters, control the material handler equipment to cease movement of actuators.

7. The computing device of claim 6, wherein the processor is further configured to:
    display, on a display screen of the computing device, a notification message describing a reason why the at least one gesture command is not implemented.

8. The computing device of claim 1, wherein the processor is further configured to:
    receive agent distance information from the image recording device, the agent distance information describing a distance of an agent providing the at least one gesture command from the material handler equipment;
    determine whether the agent distance information is at least a predetermined threshold distance; and
    in response to determining the agent distance information is less than the predetermined threshold distance, control the material handler equipment to cease movement of actuators.

9. The computing device of claim 1, wherein the processor is further configured to:
    authorize wireless connection with the gesture detection device; and
    authorize wireless connection with the image recording device.

10. The computing device of claim 1, wherein the at least one gesture command is an open fist movement, a close fist movement, an arm pull-in movement, or an arm push-out movement.

11. A method for controlling a material handler equipment with gesture commands, the method comprising:
    receiving, through a communication interface, gesture sensor data from a gesture detection device, the gesture sensor data including at least one gesture command;
    receiving, through the communication interface, image data from an image recording device, the image data including a depiction of the at least one gesture command; and
    receiving, through the communication interface, location information identifying a location of the material handler equipment, wherein the material handler equipment is a separate device from the gesture detection device;
    determining, by a processor, a control command for controlling an operation of the material handler equipment based on the gesture sensor data and the image data;
    comparing, by the processor, the location of the material handler equipment included in the location information with geo-fence parameters assigned to the material handler equipment, wherein the geo-fence parameters define a predetermined geographical area; and controlling, by the processor, operation of the material handler equipment according to the control command when the location of the material handler equipment is determined to be within the geo-fence parameters.

12. The method of claim 11, further comprising:
determining a quality factor for the gesture sensor data;
applying a gesture sensor data weighting factor to the gesture sensor data based on the determined quality factor for the gesture sensor data;
determining a quality factor for the image data;
applying an image data weighting factor to the image data based on the determined quality factor for the image data; and
determining the control command based on the weighted gesture sensor data and the weighted image data.

13. The method of claim 12, wherein the quality factor for the gesture sensor data is determined based on a speed or displacement of a detected movement described by the gesture sensor data; and
wherein the quality factor for the image data is determined based on an image quality of digital images included in the image data.

14. The method of claim 11, wherein the gesture detection device includes at least one of an electromyography sensor, an accelerometer, a gyroscope, or a magnetometer.

15. The method of claim 11, further comprising:
receiving location information describing a location of an agent providing the at least one gesture command.

16. The method of claim 15, further comprising:
comparing the location information to the geo-fence parameters;
determining whether the agent is located within the geo-fence parameters based on the comparison; and
in response to determining the agent is within the geo-fence parameters, controlling the material handler equipment to cease movement of actuators.

17. The method of claim 16, further comprising:
receiving agent distance information from the image recording device, the agent distance information describing a distance of an agent providing the at least one gesture command from the material handler equipment;
determining whether the agent distance information is at least a predetermined threshold distance; and
in response to determining the agent distance information is less than the predetermined threshold distance, controlling the material handler equipment to cease movement of actuators.

18. The method of claim 11, further comprising:
authorizing, by the processor, wireless connection with the gesture detection device; and
authorizing, by the processor, wireless connection with the image recording device.

19. The method of claim 11, wherein the at least one gesture command is a closed fist gesture, an open hand gesture, an arm pull-in gesture, an arm push-out gesture, a swing left gesture, a swing right gesture, hand at rest gesture, or an arm at rest gesture.

20. A material handler control system comprising:
a data communication interface configured to:
receive gesture sensor data from a gesture detection device positioned on an operator outside of a material handler device, wherein the material handler equipment is a separate device from the gesture detection device; and
receive an image data depicting a gesture of the operator corresponding to the received the gesture sensor data;
a processor in communication with the communication interface, the processor configured to:
determine a control command for controlling an operation of the material handler device based on the gesture sensor data and the image data; and
control operation of the material handler device according to the control command.

* * * * *